(12) United States Patent
Akasaka

(10) Patent No.: US 7,403,582 B2
(45) Date of Patent: Jul. 22, 2008

(54) SERIAL COMMUNICATION DEVICE

(75) Inventor: Nobuhiko Akasaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 687 days.

(21) Appl. No.: 10/899,072

(22) Filed: Jul. 27, 2004

(65) Prior Publication Data

US 2005/0123069 A1    Jun. 9, 2005

(30) Foreign Application Priority Data

Dec. 3, 2003    (JP)    ............................. 2003-404203

(51) Int. Cl.
*H04L 7/00* (2006.01)
(52) U.S. Cl. ..................................... 375/355
(58) Field of Classification Search ................. 375/355, 375/354, 362; 455/334, 91
See application file for complete search history.

(56) References Cited

U.S. PATENT DOCUMENTS

2004/0072552 A1* 4/2004 Park et al. ................... 455/334

FOREIGN PATENT DOCUMENTS

JP    11-275175    10/1999
JP    2002-051034    2/2002

* cited by examiner

*Primary Examiner*—Khai Tran
(74) *Attorney, Agent, or Firm*—Staas & Halsey LLP

(57) ABSTRACT

The invention is a serial communication device for receiving serial data and sampling the serial data with synchronizing with communication clocks. The device has a clock generation unit for dividing a reference clock according to a predetermined dividing value, generating the communication clock each time the number of dividing value of the reference clock is generated, and generating a supplemental clock at any timing of the reference clock between adjacent communication clock; and a data decision circuit for receiving serial data, sampling 1-bit data at sampling timings including at least the adjacent communication clocks and the supplemental clock therebetween, and deciding the 1-bit data according to the decision by majority of the plurality of the sampling data which is sampled.

14 Claims, 11 Drawing Sheets

FIG. 5A
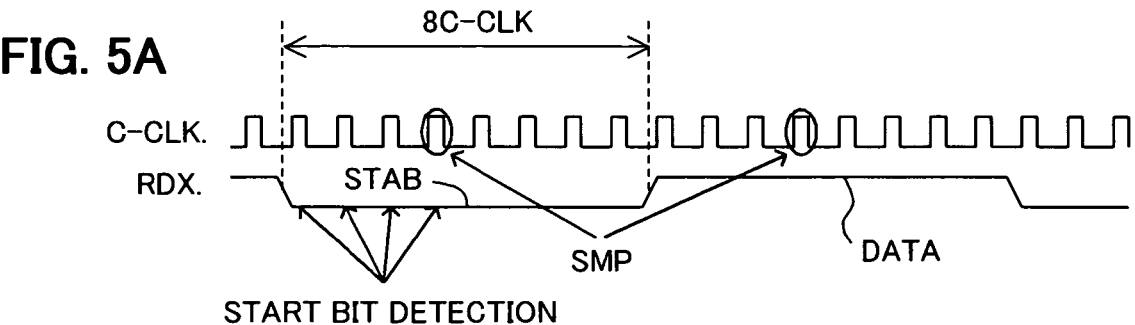
START BIT DETECTION
FIG. 5B
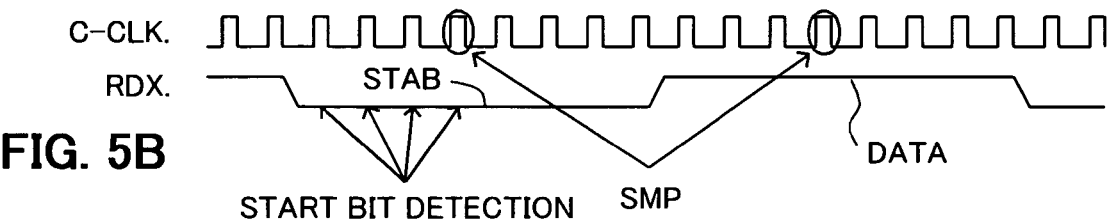
START BIT DETECTION
FIG. 6
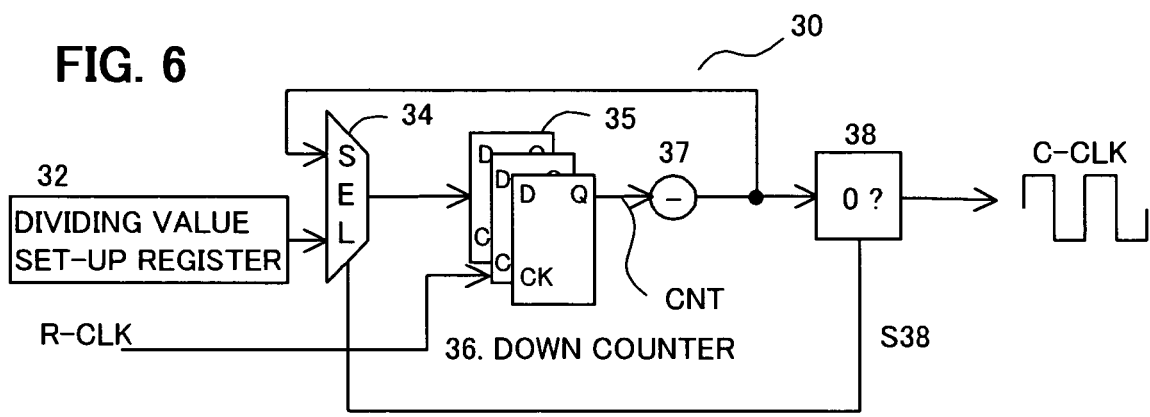
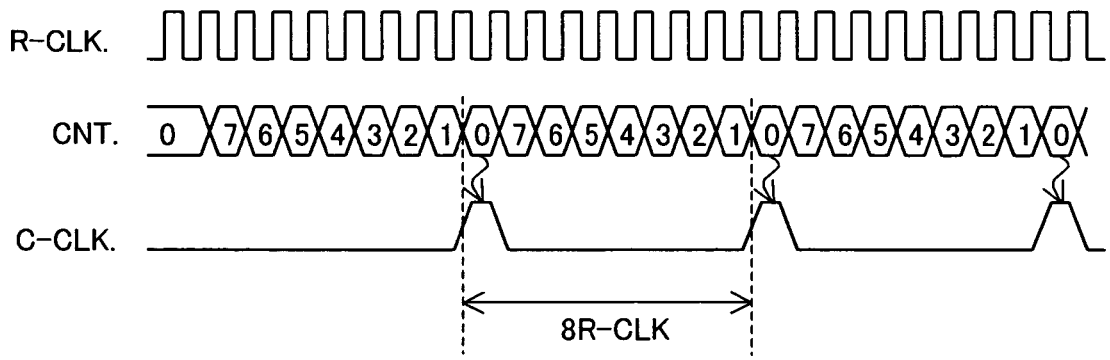

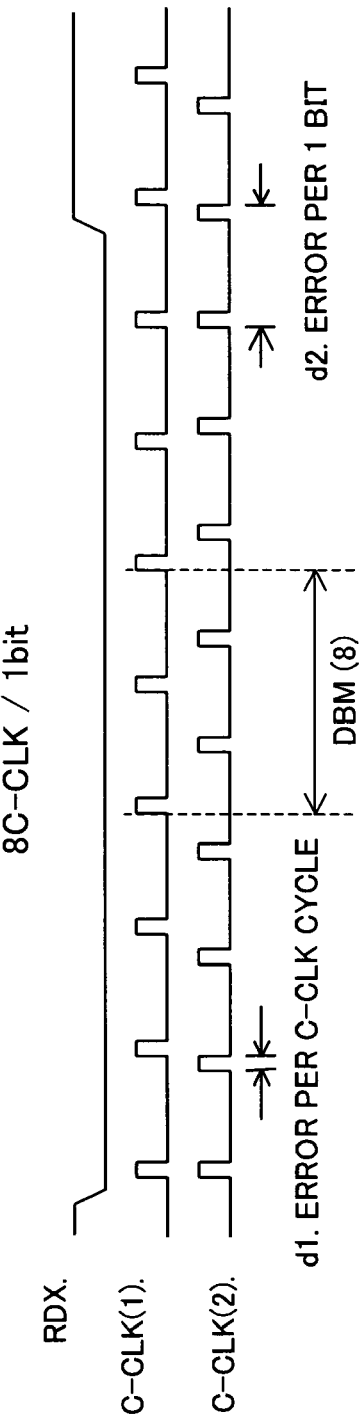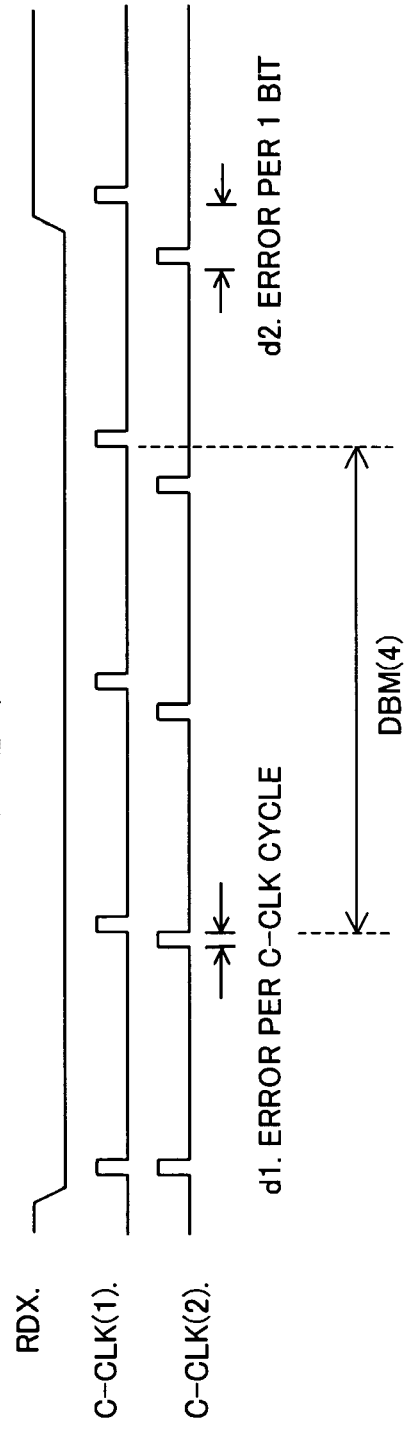

SERIAL COMMUNICATION DEVICE

CROSS-REFERENCE TO RELATED APPLICATIONS

This application is based upon and claims the benefit of priority from the prior Japanese Patent Application No. 2003-404203, filed on Dec. 3, 2003, the entire contents of which are incorporated herein by reference.

BACKGROUND OF THE INVENTION

1. Field of the Invention

The present invention relates to a serial communication device, and more particularly to a serial communication device which can handle the errors of communication speeds and prevent the receive data detection errors due to noise.

2. Description of the Related Art

As a means of communication between a host computer and an external processor, UART (Universal Asynchronous Receiver Transmitter) serial communication is widely used. In the case of UART serial communication, the transmission side and the reception side do not perform data communication according to a common synchronous clock, but the data communication speed is set in advance, and the reception side judges the receive data by the sampling clock matching with the communication speed. Therefore a mismatch of the data communication speed (cycle) and the cycle of the sampling clock becomes a problem in judging the receive data.

FIG. 1 is a diagram depicting the principle of UART serial communication. The serial communication device in an external processor connected with a host computer via a serial communication cable starts sampling detection of receive data RDX when receiving the start bit STAB which is a 1-bit L level signal inserted at the beginning of 8-bit serial data DATA, for example, and detects the H level or L level of receive data RDX with synchronizing with the H level of the sampling clock SMP-CLK. When parity bit PAB and H level stop bit STOB, which are inserted after the 8-bit serial data DATA, are detected, one frame of serial communication is completed. In non-communicating status, the data signal is maintained to H level.

In this way, the cycle of the sampling clock SMP-CLK must be matched with the serial communication speed (cycle) of the receive data, and normally the cycle of the sampling clock is set according to a predetermined specification of the communication speed at the design stage.

FIG. 2 is a block diagram depicting a conventional serial communication device. This serial communication device is comprised of the receiver unit 10, transmitter unit 20 and communication clock generation unit 30 for supplying the clock for communication to these units. The receive data RDX received from the serial communication path, which is not illustrated, is received by the data receive circuit 12, then the receive data is detected synchronizing with the communication clock C-CLK or sampling clock SMP-CLK supplied from the communication clock generation unit 30, and is converted into the parallel data 14S by the serial-parallel conversion circuit 14. The transmission target parallel data 24S is converted into serial data by the parallel-serial conversion circuit 24, and the communication drive circuit 22 drives the transmission data signal TDX with synchronizing with the communication clock C-CLK.

Such a UART serial communication device is disclosed in Japanese Patent Application Laid-Open No. 11-275175, and Japanese Patent Application Laid-Open No. 2002-51034, for example.

FIG. 3 is a diagram depicting the problems of a conventional serial communication device. In the case of UART serial communication, transmission and reception do not share synchronous clocks, but serial data is transmitted/received asynchronously. Therefore the reception side must detect data at the sampling clock with the cycle matching with the communication speed (cycle of serial data). However, the sampling clock is generated by dividing the reference clock at the reception side, and the cycle does not always perfectly match with the communication speed (cycle). Therefore, as FIG. 3 shows, even if the sampling clock SMP-CLK is generated responding to the detection of the start bit STAB, the timing of the sampling clock and the timing of each bit of serial data may be shifted within one frame if an error exists between the cycle of serial data and the cycle of sampling clock, and in this case a reception error occurs.

To solve this problem, Japanese Patent Application Laid-Open No. 2002-51034 proposes to make the generation timing of the sampling clock to be changeable to any timing. However such a change of timing is implemented by software processing, and this processing becomes a burden, and a circuit for changing timing is also required.

SUMMARY OF THE INVENTION

If noise is generated in the receive signals at the timing of the sampling clock, on the other hand, detected data becomes incorrect data. For example, when H level noise is generated in L level receive signals, if the time when noise is superimposed and the sampling clock happen to match, the receive data is detected as H level, which is incorrect. To solve this noise problem, a plurality of cycles of communication clocks may be used for a 1-bit data transfer, so that 1-bit data is sampled at a plurality of communication clocks, and data is detected based on the decision by majority of the plurality of sampling data.

However, in order to detect data by the above-mentioned decision by majority to enable noise resistant communication, the sampling timing of a plurality of communication clocks must be used for 1-bit data detection. This makes the sampling period within one cycle of serial data longer, and the influence of the shift of timing, due to the mismatch of the communication clock (sampling clock) and the data communication speed shown in FIG. 3, increases even more.

With the foregoing in view, it is an object of the present invention to provide a serial communication device to enable data detection based on the decision by majority of the plurality of sampling data so as to enable noise resistant communication, and to minimize the shift of timing due to the mismatch of communication clocks and data communication speed.

To achieve the object, the first aspect of the present invention is a serial communication device for receiving serial data and sampling the serial data with synchronizing with communication clocks, comprising a clock generation unit for dividing a reference clock according to a predetermined dividing value, generating the communication clock each time the number of dividing value of the reference clock is generated, and generating a supplemental clock at any timing of the reference clock between adjacent communication clock; and a data decision circuit for receiving serial data, sampling 1-bit data at sampling timings including at least the adjacent communication clocks and the supplemental clock therebetween, and deciding the 1-bit data according to the decision by majority of the plurality of the sampling data which is sampled.

In the first aspect of the present invention, it is preferable that when the predetermined dividing value is an odd number, the clock generation unit generates the supplemental clock at a timing of a reference clock which is shifted from a central timing between the adjacent communication clocks. When the predetermined dividing value is an even number, on the other hand, the clock generation unit generates the supplemental clock at a timing of the reference clock matching the central timing between the adjacent communication clocks, or at a timing of a reference clock which is shifted from the central timing.

According to the first aspect of the present invention, the clock generation unit generates a communication clock each time the number of the dividing value of the reference clock is generated, so the timing of the communication clock is adjusted at fine resolution corresponding to the dividing value, and the mismatch of the cycle of the communication clock and the communication speed (cycle) of the receive serial data can be minimized. The clock generation unit also generates a supplemental clock at any timing between adjacent clocks, and deciding data from the plurality of sampling data which is sampled at a plurality of timings that include at least two adjacent communication clocks and the supplemental clock therebetween, using majority logic. Therefore noise resistant communication becomes possible based on the decision by majority, and the sampling period in a 1-bit data cycle period can be decreased, minimizing reception errors due to the mismatch of the communication clock and the communication speed.

According to the above mentioned preferred embodiment, the predetermined dividing value is set to an odd number or an even number, making the timing of the communication clock to be adjustable so as to match with the communication speed (period) as much as possible, and the supplemental clock is generated between the adjusted communication clocks. In particular, even if the predetermined dividing value is an odd number, the supplemental clock is generated at a timing of the reference clock shifted from the central timing of the adjacent communication clocks. In this way, according to the embodiment, even if a relatively large dividing value is selected so as to minimize the shift of the cycle of the communication clock from the communication speed (period), the sampling period for the decision by majority can be decreased by generating the supplemental clock between the adjacent communication clocks.

BRIEF DESCRIPTION OF THE DRAWINGS

FIG. 5 are diagrams depicting the operation of the start bit detection circuit;

FIG. 6 is a block diagram depicting a general dividing circuit of the communication clock generation unit;

FIG. 7 is a waveform diagram depicting an error of the cycle of the communication clock;

FIG. 8 is a waveform diagram depicting an example when resolution to adjust the cycle of the communication clock is improved;

DESCRIPTION OF THE PREFERRED EMBODIMENTS

Embodiments of the present invention will now be described with reference to the accompanying drawings. The technical scope of the present invention, however, is not limited to these embodiments, but embraces the content of the Claims and the equivalents thereof.

Figure 2:
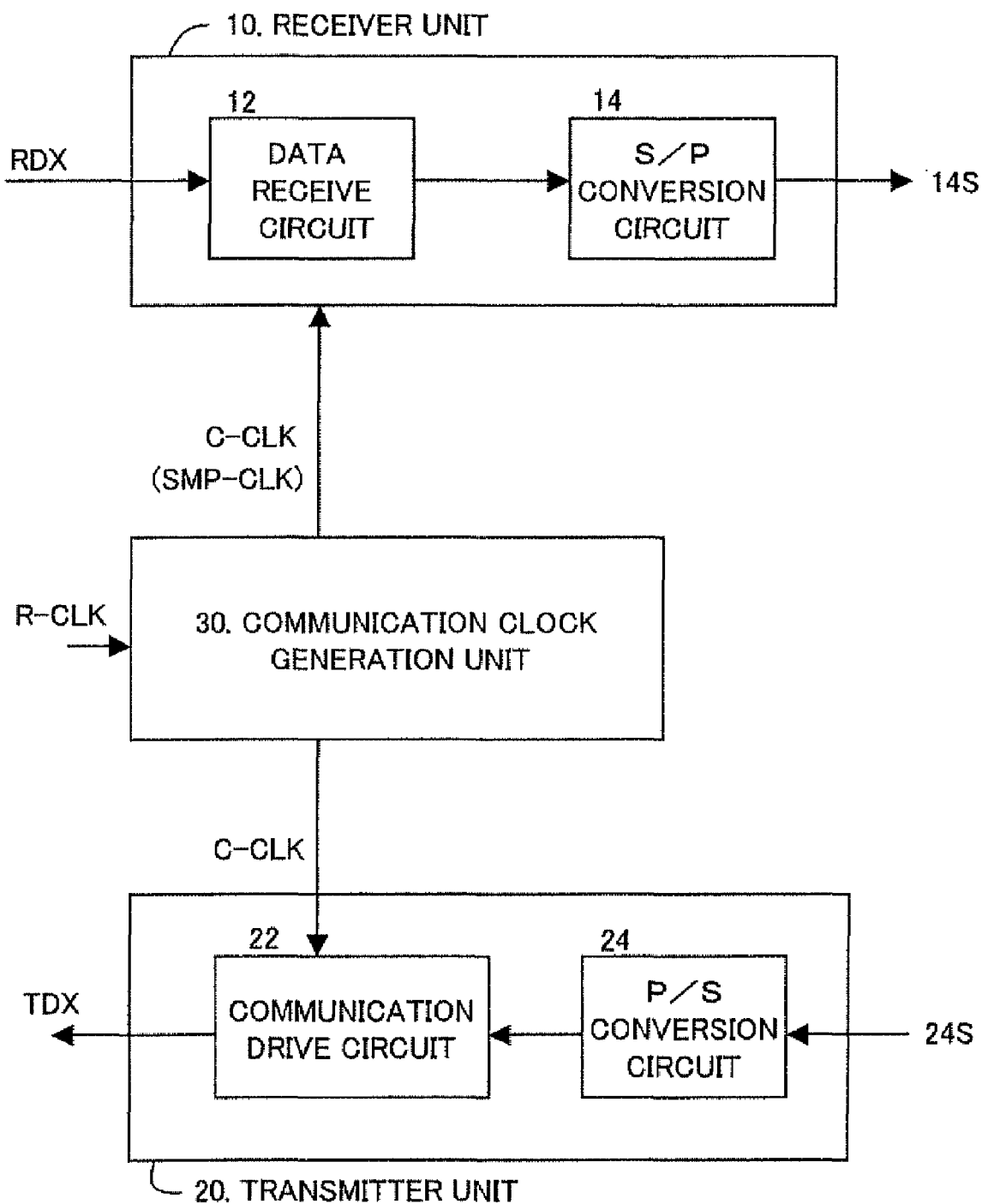
FIG. 2 is a block diagram depicting a conventional serial communication device.
Figure 3:
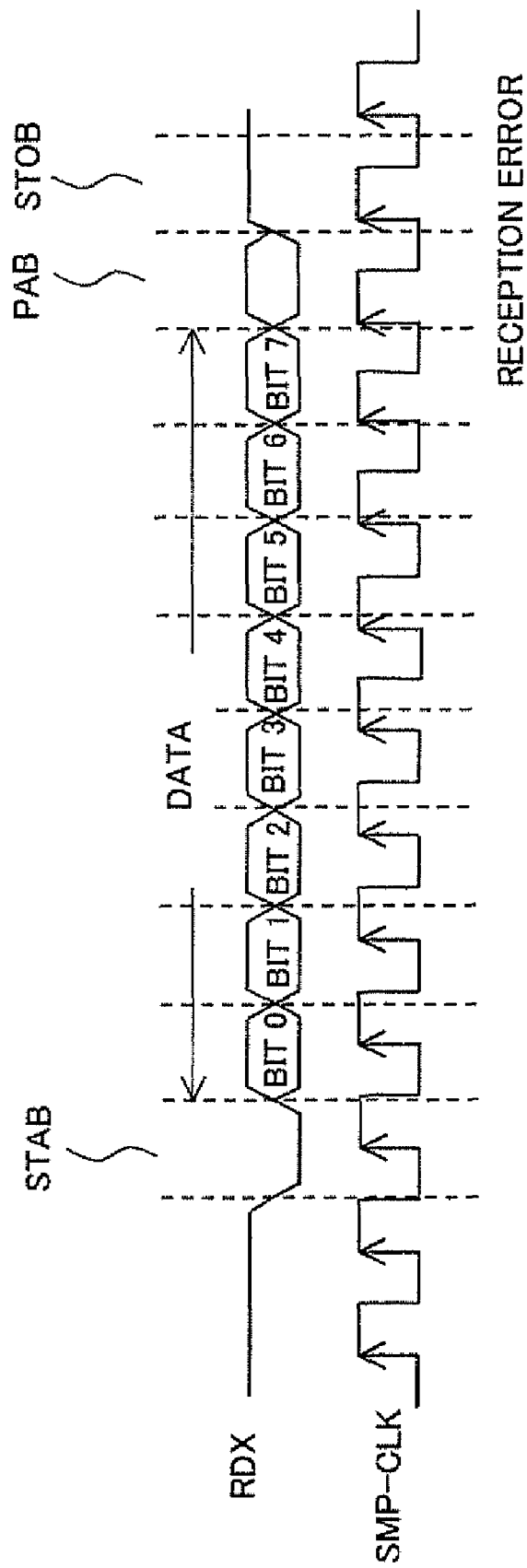
FIG. 3 is a diagram depicting the problem of the conventional serial communication device.
Figure 4:
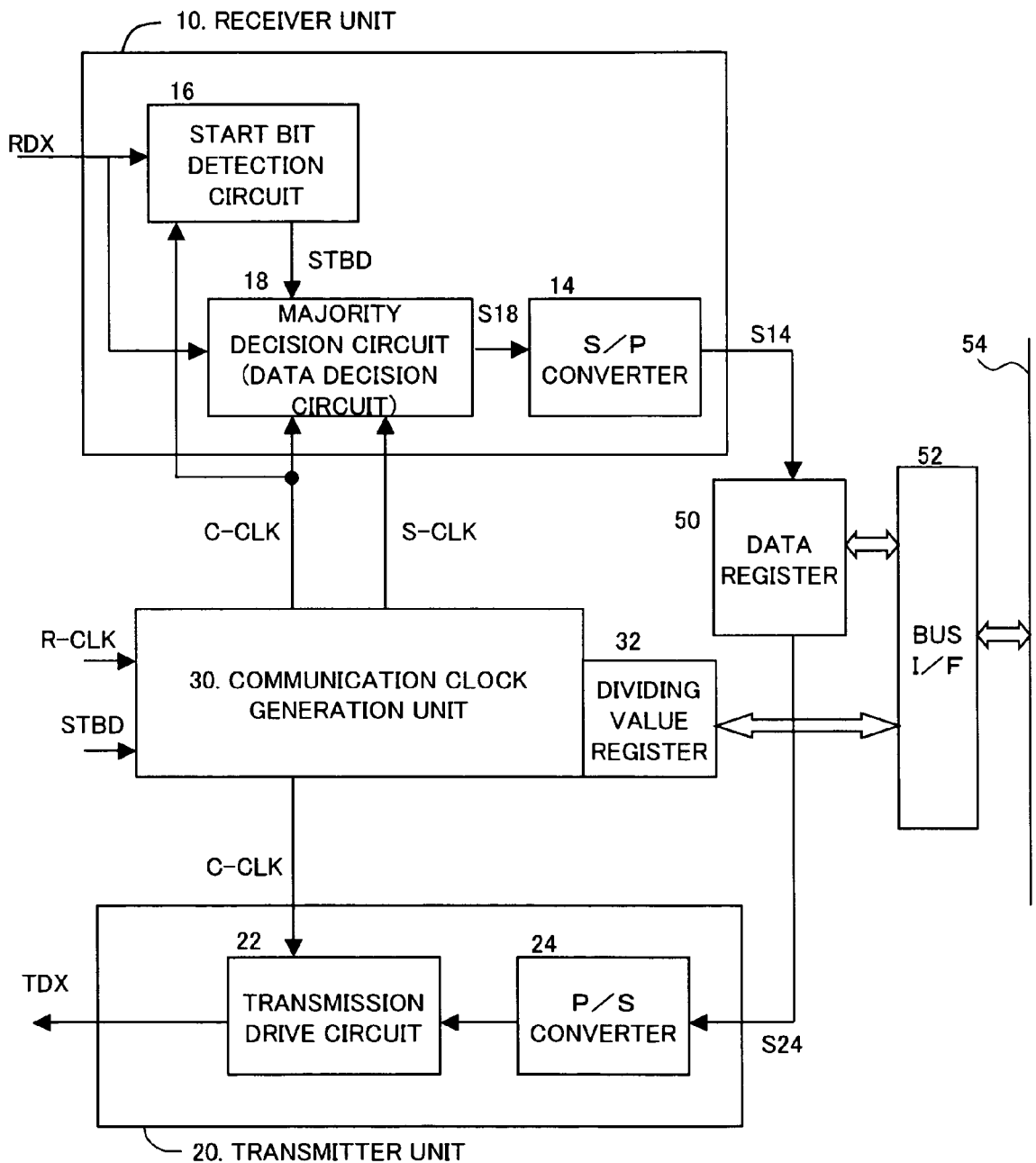
FIG. 4 is a block diagram depicting the serial communication device according to the present embodiment.

FIG. 4 is a block diagram depicting the serial communication device according to the present embodiment. As with the conventional example of FIG. 2, this serial communication device is comprised of a receiver unit 10 for receiving the receive data RDX, a transmitter unit 20 for transmitting the transmission data TDX, and a communication clock generation unit 30 which generates the communication clock and supplies it to the receiver unit and the transmitter unit.

The receiver unit 10 is further comprised of a start bit detection circuit 16 which detects the start bit to be inserted at the beginning of one frame of the receive data RDX and generates the start bit detection signal STBD, a data decision circuit 18 which decides the data of each bit by majority based on a plurality of samplings after the timing of the start bit detection signal STBD from the start bit detection circuit 16, and a serial-parallel conversion circuit 14 which converts the serial data S18 decided by the data decision circuit 18 into parallel data. The converted parallel receive data S14 is stored in the data register 50 and is output to the data bus 54 in the system via the bus interface 52.

The transmitter unit 20 is further comprised of a parallel-serial conversion circuit 24 which converts the parallel communication data S24, stored in the data register 50 via the bus interface 52 from the data bus 54, into serial data, and a transmission drive circuit 22 which transmits the serial transmission data.

In the communication clock generation unit 30, a dividing value register 32 is disposed, where the dividing values, which are set via the data bus 54 or are set in advance, are stored. The communication clock generation unit 30 starts dividing the reference clock R-CLK responding to the start bit detection signal STBD, generates the communication clock C-CLK each time the number of dividing values of the reference clocks R-CLK are generated, and generates a supplemental clock at the timing of any reference clock which is between adjacent communication clocks. The generation timing of the supplemental clock is preferably set to a timing of the reference clock roughly at the center of the adjacent communication clocks, but may be shifted in either direction from the center.

The data decision circuit 18 samples one bit of receive data at a plurality of timings that include at least the adjacent communication clocks C-CLK and the supplemental clock S-CLK therebetween, and decides the receive data based on the decision by majority of these plurality of sampling data. By the sampling using the communication clocks and the supplemental clocks, a sampling method, which is noise resistant and whose sampling timing matches with the communication speed (cycle) of the receive data as much as possible with decreasing the sampling period, can be provided. This will be clarified by the description herein below.

The serial communication device according to the present embodiment uses a plurality of cycles of communication clocks for a one bit data transfer. Also the number of cycles of the communication clock per one bit data is minimized so as to make the resolution of the timing adjustment of the communication clock as high as possible. By increasing the resolution of the timing adjustment, the shift between the communication speed (cycle) and the timing of the communication clock can be minimized. This reason will be described below.

In conventional UART serial communication, it has been proposed to use 8 or 16 cycles of the communication clock for a 1 bit data transfer. The serial communication device uses the communication clock as enable signals for data transmission/reception, To detect the start bit, judge the receive data and drive the transmission data. The communication clock is generated by dividing the reference clock on the chip, and by arbitrarily setting this dividing value so that the timing of the communication clock is adjusted to match an arbitrary communication speed (cycle).

In the case of UART communication, the receive data is input asynchronously with the reference clock and the communication clock of the serial communication device. Therefore the start bit detection circuit 16 always samples the receive data, and detects the start of a data frame. So the sampling of the start bit is executed at the timing of the communication clock C-CLK.

FIG. 5 are diagrams depicting the operation of the start bit detection circuit. This is an example when 8 cycles of the communication clock C-CLK is used for 1 bit of data. As described in FIG. 1, the non-communication level in UART serial communication is H level, and the frame of the data is started from the one bit of the start bit STAB. So the start bit detection circuit 16 samples the receive data RDX at the timing of the communication clock C-CLK, and regards the detection of continuous L levels as the start bit. In the case of the example in FIG. 5, the start bit is decided if the L level is detected continuously four times. Also the sampling point SMP of the data DATA after the start bit is decided. Considering the mismatch of the communication speed (cycle) and the cycle of the communication clock, it is preferable that this sampling point SMP is a communication clock at around the center of the one bit of the data period as much as possible. Therefore in the example in FIG. 5, the fourth communication clock of the continuous four times of L level detected is decided as the sampling timing clock.

In FIG. 5A and FIG. 5B, the timing of the receive data is shifted slightly, and therefore four communication clocks for detecting the L level continuously in FIG. 5A and the four communication clocks for detecting the L level continuously in FIG. 5B are shifted 1 cycle. In this way, by generating a plurality of communication clocks to be the sampling timing in 1 bit of the data period, a sampling timing SMP that matches the period of the receive data to be received asynchronously can be selected.

Now the dividing operation of the communication clock generation unit, where the generation of shift between the communication speed (cycle) and the timing is generated, will be described.

FIG. 6 is a block diagram depicting a dividing circuit of the communication clock generation unit. The communication clock generation unit 30 is comprised of a dividing value setup register 32, a selector 34, a down counter 36 which is further comprised of a flip-flop 35 and subtractor 37, and a capacitor 38. At first, the dividing value, which is set in the dividing value setup register 32, is loaded to the flip-flop 35 of the down counter 36, and responding to the reference clock R-CLK, the output of the subtractor 37 is loaded to the flip-flop 35 via the selector 34, so that the dividing value is counted down. By the reset signal S38, which the comparator 38 generates at the timing when the count value CNT becomes zero, the selector 34 is switched and the dividing value of the dividing value setup register 32 is reloaded to the flip-flop 35 again responding to the reference clock R-CLK.

As the operation waveform diagram in FIG. 6 shows, when a communication clock C-CLK is generated at every 8 reference clocks R-CLK, that is, when the dividing value M is set to 8 (M=8), a value smaller than the dividing value M by one, that is M−1=7, is set in the register 32. Therefore the counter value CNT to be stored in the flip-flop 35 at reset is the dividing value M−1=7. And the counter value CNT is counted down as 7, 6, 5, 4, . . . 0, and is reset to the dividing value M−1=7 each time the counter value CNT becomes zero. In other words, the communication clock C-CLK is generated each time 8 reference clocks R-CLK are generated. The start timing of count down of the down counter 36 is determined depending on which reference clock, out of the continuous 8 reference clocks, is selected to be the reset timing. Also the cycle of the communication clock can be adjusted by the dividing value to be set. If the dividing value is set to a value greater than 8, the cycle becomes longer, and if the dividing value is set to a value smaller than 8, the cycle becomes shorter. In other words, the resolution of the adjustable cycle of the communication clock C-CLK, where the dividing value M is 8(M=8) and the 8 reference clocks are the basic cycle, is about ⅛ the cycle of the communication clock.

The clock generation circuit in FIG. 6 can be comprised of an up counter, instead of the down counter 36. In this case, an adder is disposed instead of the subtractor 37, and the flip-flop 34 is reset to zero by the reset signal S38, and the comparison value of the comparator becomes a value which is set in the register 32.

FIG. 7 is a waveform diagram depicting an error of the cycle of the communication clock. FIG. 7 is an example when the number of dividing value M (=8) of the communication clocks are generated in the communication cycle of communication data RDX, that is 1 bit data period. Compared with the communication clock C-CLK (1) which perfectly matches the cycle of the communication data, the communication clock C-CLK (2), which is generated by dividing the reference clock R-CLK in the system, has a slight error d1 in the cycle. This is because it is actually difficult in many cases to perfectly match the speed (cycle) of the reference clock R-CLK and the speed (cycle) of the communication data, and as long as the communication clock is generated by dividing the reference clock, a slight error is generated from the ideal communication clock.

Figure 1:
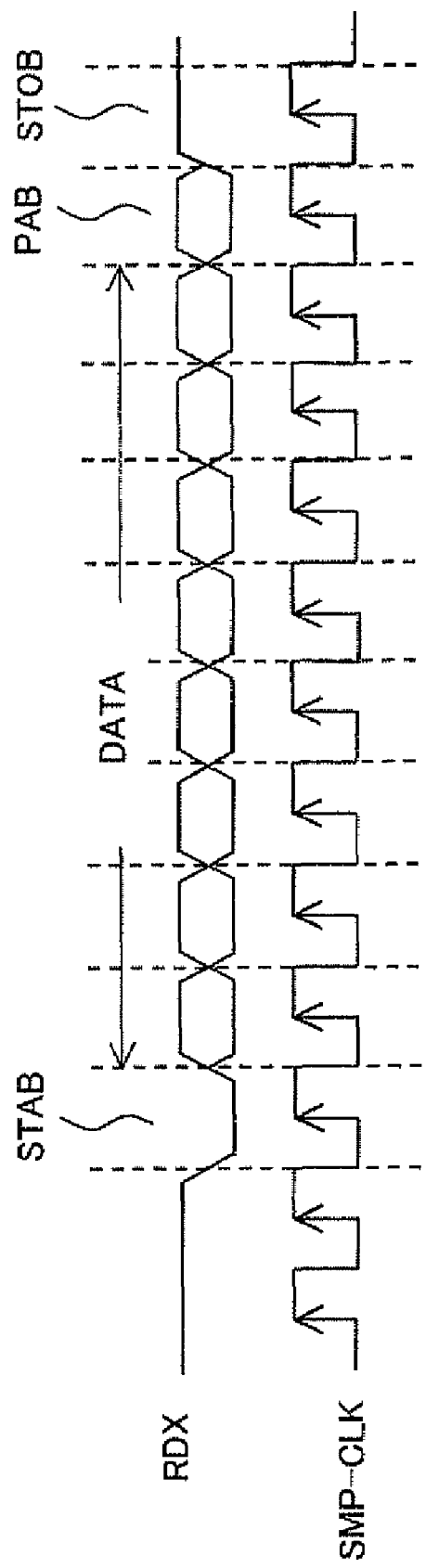
FIG. 1 is a diagram depicting the principle of UART serial communication.

Therefore if 8 communication clocks are generated in one bit of the data period, the error d2 of the communication clock cycle in one bit of the data period becomes d1×8. And one frame of UART communication consists of 1 bit of the start bit, 7 or 8 bits of the data, 1 bit of the parity bit and 1 or 2 bits of the stop bit, a total of 9 to 12 bits, as shown in FIG. 1. So the error of the cycle of the communication clock per frame is 9-12 times the error d2 per bit, and 72-96 times the error d1 of the cycle of the communication clock.

As described above, the cycle of the communication clock is influenced by the frequency of the reference clock, and if the cycle of the reference clock is N and the dividing value is M, then the cycle X of the communication clock becomes X=N×M. And to make the cycle Y of the 1 bit data to be equal to 8 times the cycle X of the communication clock, the dividing value M must be adjusted so as to be Y=8×N×M. This is because the cycle N of the reference clock R-CLK is normally fixed. And normally the dividing value M can only be an integer, so the cycle of the communication clock can be adjusted only by the resolution of the dividing value M.

FIG. 8 is a waveform diagram depicting an example when the adjustment,resolution of the cycle of the communication clock is improved. This is an example when four communication clocks C-CLK are generated for 1 bit of the data period, where the dividing value M of the communication clock generation unit shown in FIG. 6 is set to double the dividing value M=8 in FIG. 7, that is 16. By setting the dividing value M to 16, the communication clock C-CLK is generated at each 16 reference clocks, that is the cycle of the communication clock becomes longer, doubling. Along with this, the cycle of the communication clock can be adjusted by 1/16 the resolution of the reference cycle (16 reference clock cycles). In other words, by changing the dividing value 16 to 15 or 17, adjustment with a narrower resolution becomes possible. In FIG. 7, where 8 communication clocks are generated in 1 bit of the data period, the dividing value M=8 to be the reference is changed to 7 or 9, so the resolution per cycle of the communication clock increases as 1/8.

As a result, the error d1 per cycle of the communication clock becomes smaller compared with the case in FIG. 7, since the cycle of the communication clocks increased. The error d2 per 1 bit of the data period also decreases accordingly. By decreasing the cycle of the number of communication clocks in the 1 bit of the data period in this way, errors of the generatable communication clock C-CLK (2) from the ideal communication clock C-CLK (1) can be decreased, and the mismatch of the cycle of the communication clock and the cycle of the communication data can be minimized.

Figure 9:
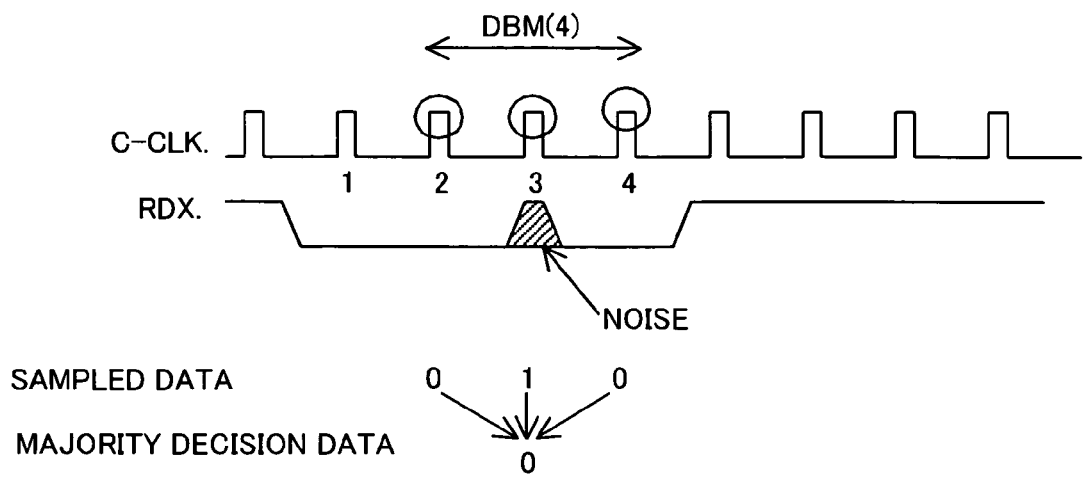
FIG. 9 is a waveform diagram depicting the operation of the data decision by majority.

FIG. 9 is a waveform diagram depicting the operation of data decision by majority. To perform noise resistant serial communication, it is desirable to make the sampling timing of the receive data a plurality of times, and data is decided by majority of a plurality (preferably an odd number) of sampled data. Therefore in FIG. 9, the second, third and fourth communication clocks, out of the four communication clocks C-CLK, are used as the sampling clocks. And the receive data is judged by the majority of sampled data at each sampling point. In the example in FIG. 9, noise is superimposed at the sampling timing of the third communication clock C-CLK, but the sampled data at the second and fourth communication clocks are correct, so the correct receive data "0=L" is decided by majority.

However, if four communication clock cycles are assigned to 1 bit of the data period to suppress errors of the cycle of the communication clocks, the period where the three sampling clocks, which is the minimum requirement for decision by majority, are generated, becomes long. In other words, the decision by majority period DBM (4), when four communication clock cycles are assigned to 1 bit of the data period shown in FIG. 8, is longer than the decision by majority period DBM (8) when 8 communication clock cycles are assigned to 1 bit of the data period shown in FIG. 7. As a result, in one frame which consists of a plurality of bits, the decision by majority period may not be able to match with the cycle of the serial communication data.

Figure 10:
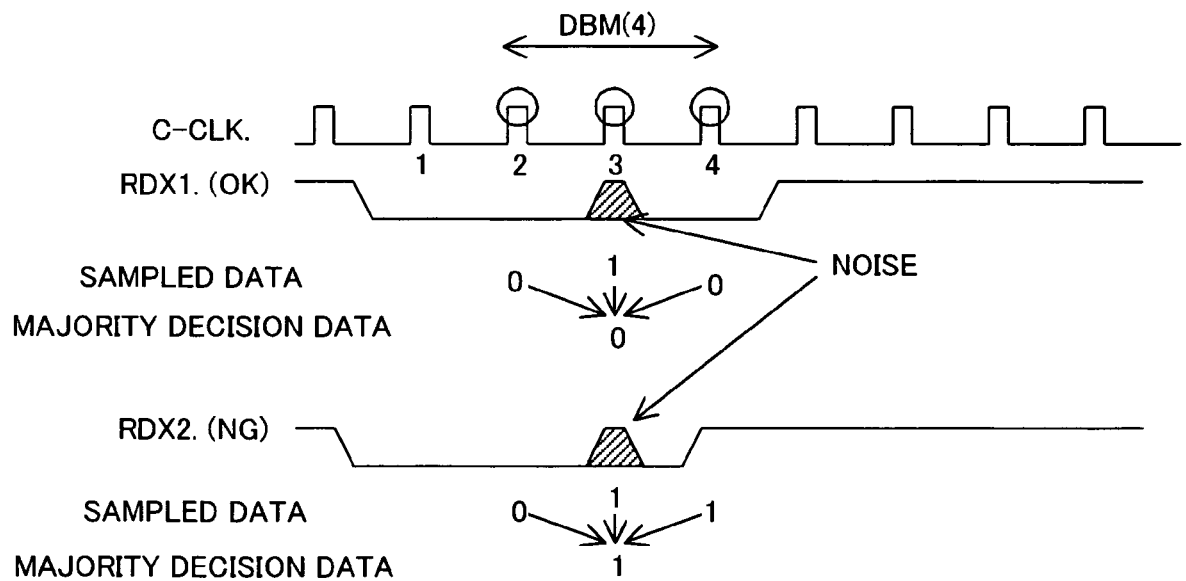
FIG. 10 is a waveform diagram depicting the problem of the operation of data decision by majority.

FIG. 10 is a waveform diagram depicting the problem of the operation of the data decision by majority. When four communication clock cycles are assigned per bit, and the sampled data of the second, third and fourth communication clocks are processed based on the decision by majority, the decision by majority period becomes long, as described above. Because of this, majority decision can be performed appropriately if the cycle of the receive data RDX1 is exactly as the specification, but if the cycle thereof becomes shorter than the specification due to the fluctuation of the cycle of the receive data caused by the communication line, as seen in the receive data RDX2, then the decision by majority period DBM (4) mismatches with the data period, and decision by majority is performed inappropriately. In the case of the example in FIG. 10, the fourth communication clock shifts to the next data period, where the next data is sampled.

As FIG. 10 shows, the fluctuation of the cycle of the receive data and the accumulation of errors of the communication clocks within 1 frame together may cause problems in the decision by majority.

Figure 11:
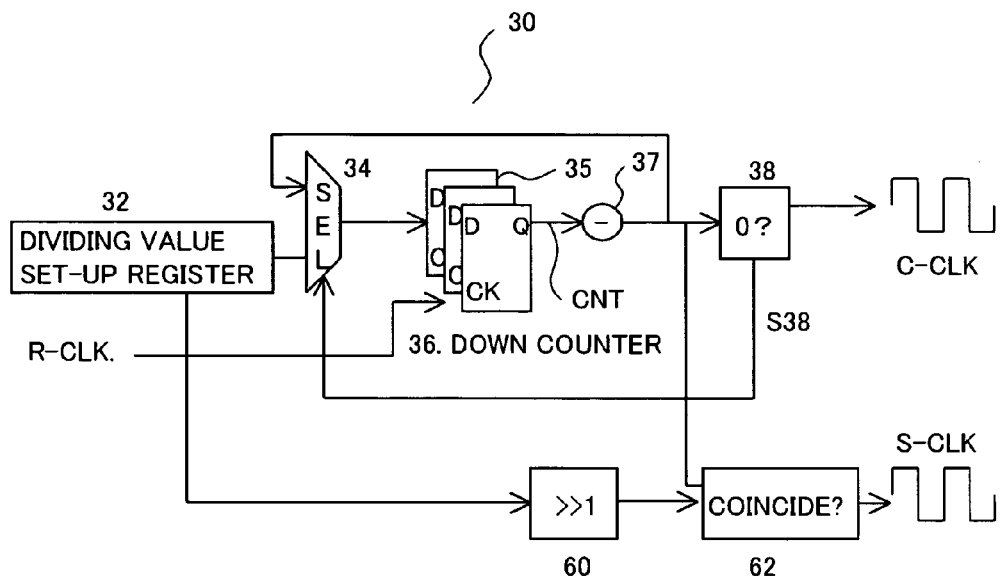
FIG. 11 is a block diagram depicting the communication clock generation unit according to the present embodiment.

FIG. 11 is a block diagram depicting the communication clock generation unit according to the present embodiment. This communication clock generation unit 30 is comprised of a dividing value setup register 32 where the dividing value M−1 is set for the dividing value M, a selector 34, a down counter 36 which is further comprised of a plurality of bits of flip-flop 35 and a subtractor 37, and a comparator 38. Up to this point FIG. 11 is the same as the example in FIG. 6. Therefore the count down operation of the down counter 36 and the reset operation are the same as FIG. 6.

The communication clock generation unit 30 in FIG. 11 is further comprised of a supplemental clock timing generation section 60 for generating a value of about ½ the value M−1 which is set in the dividing value setup register 32, and a supplemental clock generation section 62 which compares the value when the counter value CNT is subtracted and the value (M−1)/2 generated by the supplemental clock timing generation section 60, and generates a supplemental clock S-CLK at the matched timing.

The supplemental clock timing generation section 60 is comprised of a shift circuit which shifts the value M−1 being set in the dividing value setup register 32 to the right 1 bit, for example. This may be a circuit which shifts the value M−1 to the right 1 bit and adds +1. Or +1 may be added or not after the value M−1 is shifted to the right 1 bit, depending on whether the dividing value M is odd or even.

The communication clock generation unit 30 in FIG. 11 generates the communication clock C-CLK each time the number of the dividing values M of the reference clocks R-CLK are generated, according to the value M−1 which is set in the dividing value setup register 32, just like FIG. 6. In other words, just like the case of the circuit in FIG. 6, the comparator 38 generates the communication clock C-CLK at the timing when the counter value CNT of the down counter 36 becomes zero. And the supplemental clock generation section 62 generates the supplemental clock S-CLK at any timing when the counter value CNT is between the set value M−1 and 0.

Figure 12:
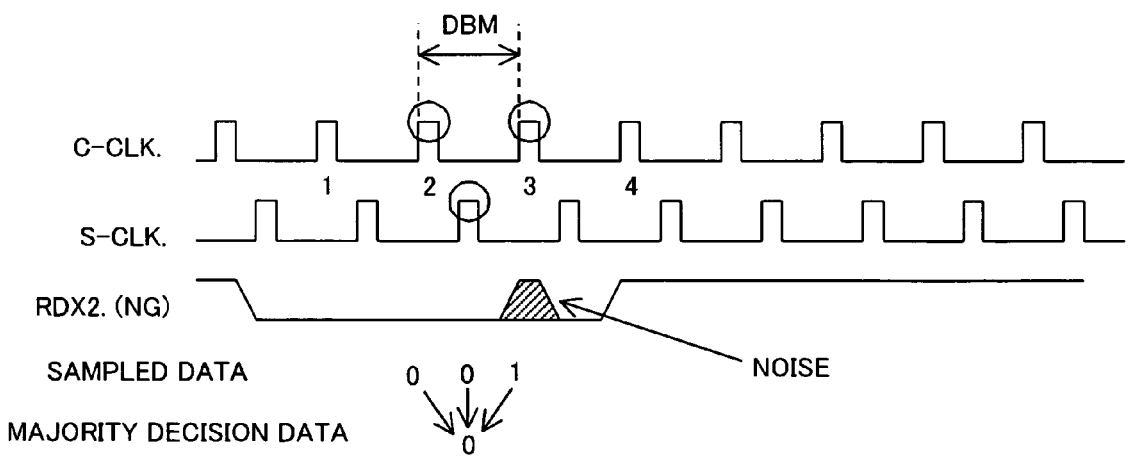
FIG. 12 is a waveform diagram depicting majority decision processing using the communication clock and the supplemental clock according to the present embodiment.

FIG. 12 is a waveform diagram depicting the decision by majority processing using the communication clock and the supplemental clock according to the present embodiment.

The communication clock C-CLK and the supplemental clock S-CLK generated by the communication clock generation unit 30 are supplied to the data decision circuit 18, the data decision circuit 18 samples the receive data RDX2 at the timings of the second and third communication clocks C-CLK and the supplemental clock S-CLK which is generated therebetween, and decides the receive data by the majority of the three sampling data. Just like the receive data RDX2 where the cycle becomes shorter by the fluctuation of the waveform diagram in FIG. 10, the cycle of the receive data RDX2 becomes short in the example in FIG. 12, and the fourth communication clock is not in the period of the receive data. However, the sampling timing becomes the supplemental clock S-CLK, which is generated between the adjacent two communication clocks C-CLK, and the decision by majority period DBM is short. As a result, appropriate sampling becomes possible, and decision by majority can be executed correctly.

The number of communication clocks to be assigned to 1 bit of the data period is preferably 2n (n is integer), that is 4, 8, 16, 32 . . . because of the hardware configuration requirements. In this case, it is preferable to minimize this number in order to minimize errors of the cycle of the communication clock with respect to the communication speed (cycle). And for decision by majority, it is preferable to sample the receive data using a pair of adjacent communication clocks which position at the center section of the cycle of the data and the supplemental clock to be generated therebetween, out of the $2^n$ of these communication clocks, and detect three sampled data. Therefore if there are four communication clocks for 1 bit of data, the second and third clocks and the supplemental clock therebetween are used as the sampling timings. If there are 8 communication clocks for 1 bit of data, the fourth and fifth communication clocks and the supplemental clock therebetween are used as the sampling timings. The former is preferable to minimize the errors of the cycle of the communication clock.

The communication clocks and the supplemental clocks according to the present embodiment shown in FIG. 12 are clearly different from the 8 communication clocks with a short cycle shown in FIG. 6 and FIG. 7. In other words, when the 8 communication clocks are assigned to 1 bit of the data period shown in FIG. 6 and FIG. 7, the communication clocks is generated each time the dividing value 8 of reference clocks are generated. This cycle of the communication clocks can be adjusted by variably setting the dividing value M=8, but the resolution of the adjustment is ⅛ for one cycle.

Whereas the sampling clocks comprised of the communication clocks and the supplemental clocks in the present embodiment are not always generated each time the same number of reference clocks are generated. The communication clock is always generated each time the same number of reference clocks corresponding to the dividing value M (e.g. 15 or 16) are generated, but all the sampling clocks comprised of the communication clocks and the supplemental clocks are not always generated each time a predetermined number of reference clocks elapse. What is set in the register is the dividing value M (more precisely M−1), which corresponds to a communication clock generation timing, and the supplemental clock is merely set to be generated at any timing between the adjacent communication clocks. Therefore, it is allowable that the supplemental clock is generated at a timing different from the central timing between adjacent communication clocks. Each one of the communication clocks and the supplemental clocks is generated each time a number of reference clocks, corresponding to a dividing value M (e.g. M=15 or 16), which is greater than the dividing value of the communication clock (M=8) shown in FIG. 6 and FIG. 7, elapse, therefore the resolution to adjust the sampling clock comprised of the communication clocks and the supplemental clocks shown in FIG. 12 is higher than that of the communication clocks shown in FIG. 6 and FIG. 7.

Figure 13A:
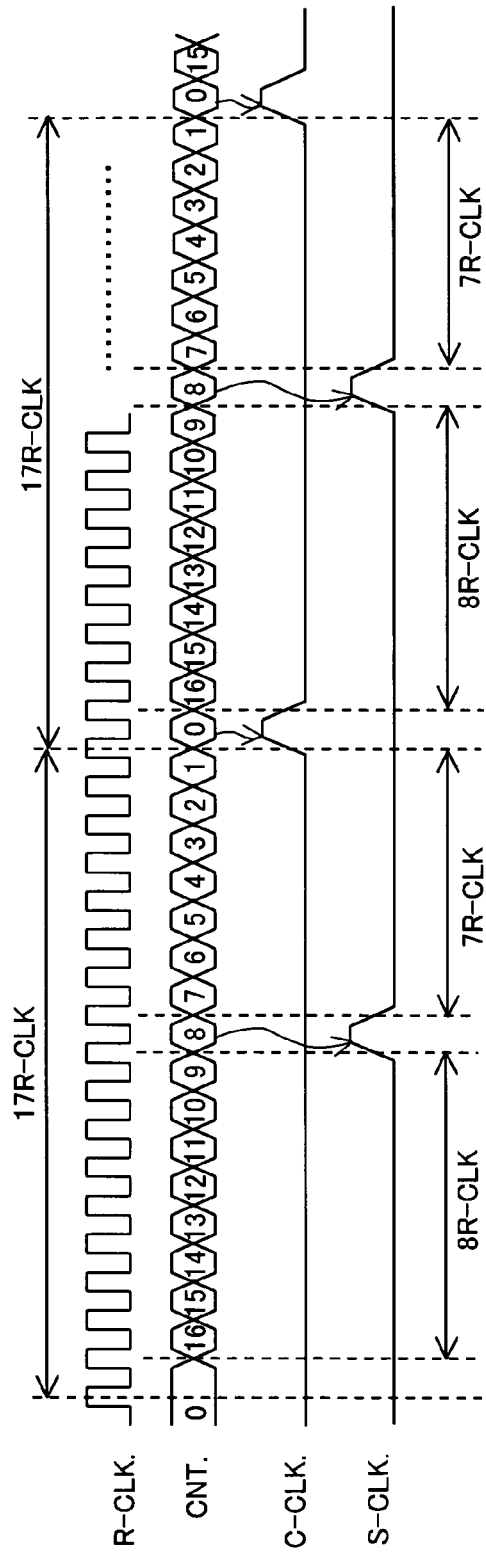
FIG. 13 are waveform diagrams depicting the operation of the communication clock generation circuit according to the present embodiment.

FIG. 13 are waveform diagrams depicting the operation of the communication clock generation circuit according to the present embodiment. FIG. 13A is an example when the dividing value M=17 and a communication clock is generated each time 17 reference clocks R-CLK are generated. The dividing value M−1=16 is loaded to the flip-flop 35, which is counted down synchronizing with the reference clock R-CLK, and the communication clock C-CLK is generated each time the counter value CNT becomes zero, every 17 reference clocks R-CLK. And the supplemental clock timing generation section 60 supplies the supplemental clock timing value (1000=8), which is a value when the dividing value M−1=16 (10000) is shifted to the right 1 bit, to the supplemental clock generation section 62. The supplemental clock generation section 62 generates the supplemental clock S-CLK at the timing when the counter value CNT becomes 8. Therefore as FIG. 13A shows, the communication clock C-CLK is generated each time M=17 of reference clocks R-CLK are generated, and the supplemental clock S-CLK is generated at the timing around the center of the adjacent communication clocks C-CLK. While 8 reference clocks R-CLK are generated between the communication clock and the subsequent supplemental clock, 7 reference clocks R-CLK are generated between the supplemental clock and the subsequent communication clock. In other words, the communication clocks and the supplemental clocks in FIG. 13A are different from the communication clocks with the dividing value M=8 shown in FIG. 6 and FIG. 7.

Figure 13B:
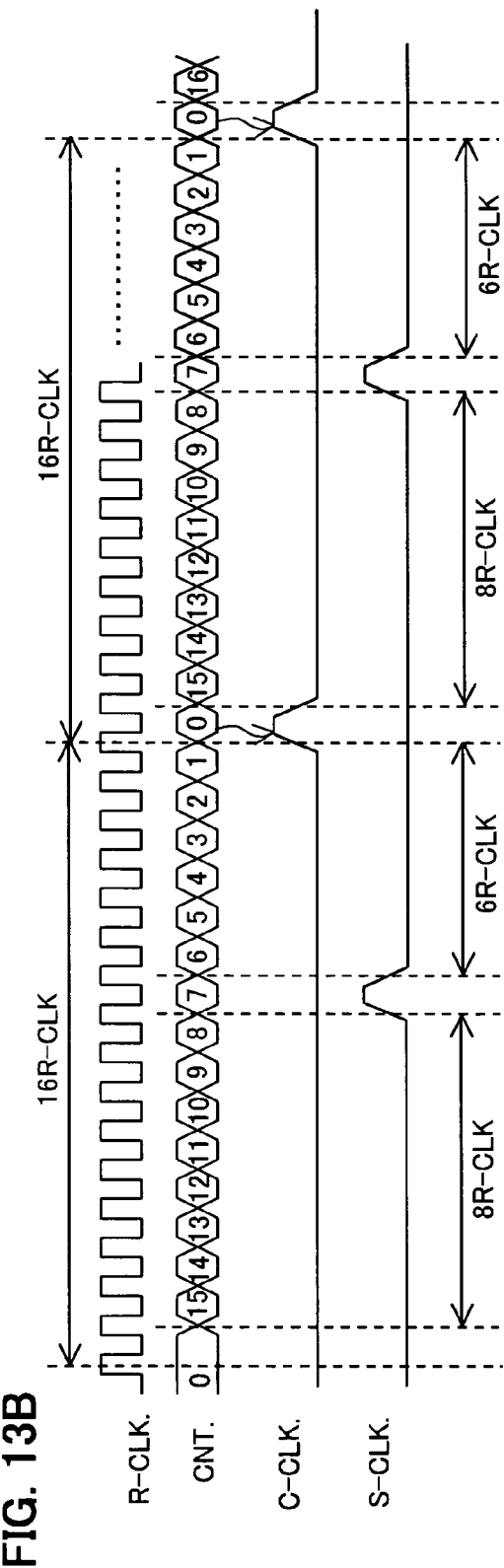

FIG. 13B is an example when the dividing value M=16 and a communication clock are generated each time 16 reference clocks R-CLK are generated. Just like FIG. 13A, the dividing value M−1=15 is loaded to the flip-flop 35, which is counted down synchronizing with the reference clock R-CLK, and the communication clock C-CLK is generated each time the counter value CNT becomes zero. And the supplemental clock timing generation section 60 supplies the supplemental clock timing value (0111=7), which is a value when the dividing value M−1=15 (011111) is shifted to the right 1 bit, to the supplemental clock generation section 62. The supplemental clock generation section 62 generates the supplemental clock S-CLK at the timing when the counter value CNT becomes 7. Therefore as FIG. 13B shows, the communication clock C-CLK is generated each time M=16 of reference clocks R-CLK are generated, and the supplemental clock S-CLK is generated at the timing around the center of the adjacent communication clocks C-CLK. In this case however, while 8 reference clocks R-CLK are generated between the communication clock and the subsequent supplemental clock, 6 reference clocks R-CLK are generated between the supplemental clock and the subsequent communication clock. In other words, in this case, both the communication clocks and the supplemental clocks are different from the communication clocks with the dividing value M=8 shown in FIG. 6 and FIG. 7.

As the above description shows, if the dividing value M=18 is set, the communication clock C-CLK is generated at every 18 reference clocks, and the supplemental clock S-CLK is generated at the timing when the counter value is 1000=8. In other words, while 9 reference clocks R-CLK are generated between the communication clock and the subsequent supplemental clock, 7 reference clocks R-CLK are generated between the supplemental clock and the subsequent communication clock.

In the case of the configuration in FIG. 11, where the supplemental clock timing generation section 60 in the communication clock generation unit 30 shifts 1 bit to the right and increments +1, the supplemental clock is generated at the timing when the counter value is 9 in the example in FIG. 13A, and the supplemental clock is generated at the timing when the counter value is 8 in the example in FIG. 13B. Therefore in the case of FIG. 13A where the dividing value M is an odd number, that is where the communication clock is generated each time an odd number of reference clocks are generated, the generation timing of the supplemental clock is shifted from the center of the adjacent communication clocks, but in the case of FIG. 13B, where the dividing value M is an even number, that is where the communication clock is generated each time an even number of reference clocks are generated, the generation timing of the supplemental clock matches the center of the adjacent communication clocks. In other words, in this case, the communication clock and the supplemental clock in FIG. 13B become the same as the communication clock with the dividing value M=8 shown in FIG. 6 and FIG. 7.

In the case of the configuration where the supplemental clock timing generation section 60 in the communication clock generation unit 30 only shifts 1 bit to the right when the dividing value M is an odd number, and shifts 1 bit to the right then increments +1 when the dividing value M is an even number, the supplemental clock is generated at the timing when the counter value is 8 in the example in FIG. 13A, and the supplemental clock is generated at the timing when the counter value is 8 in the example in FIG. 13B.

Figure 14:
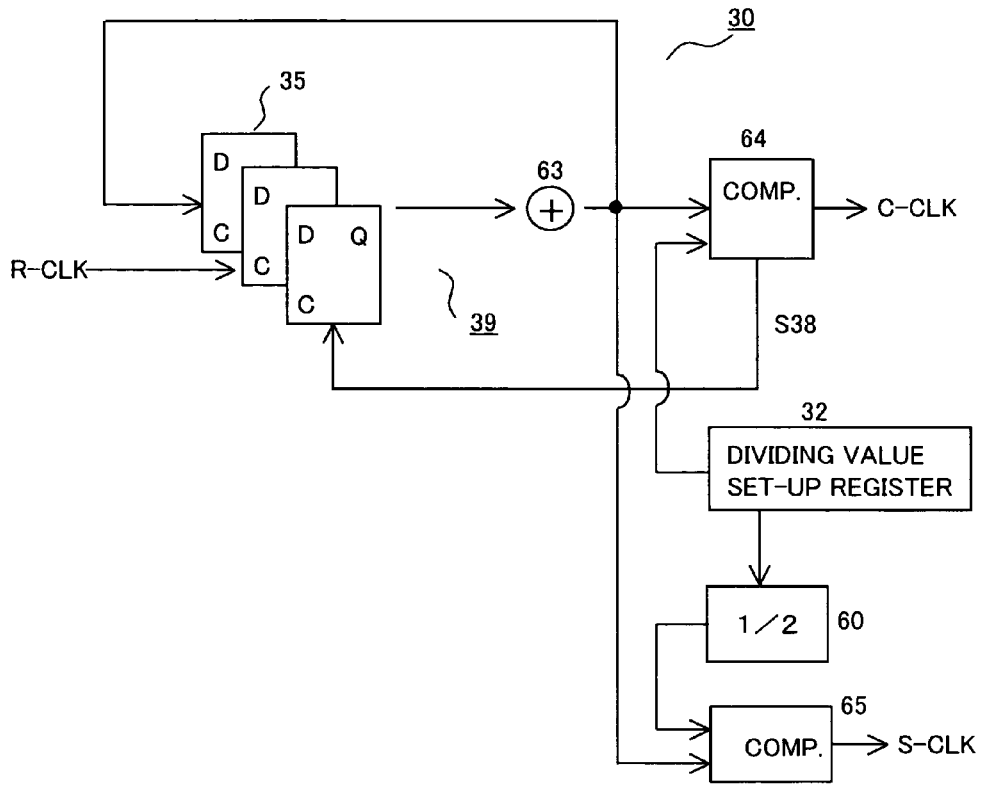
FIG. 14 is a block diagram depicting another communication clock generation unit according to the present embodiment.

FIG. 14 is a block diagram depicting another communication clock generation unit according to the present embodiment. This communication clock generation unit 30 is comprised of an up counter 39, which is further comprised of a flip-flop 35 and an adder 63, a comparator 64 for generating a communication clock C-CLK when the counter value of the up counter and the setup value of the dividing value setup register 32 are matched in comparison, and a comparator 65 for generating a supplemental clock S-CLK when the ½ value of the setup value of the dividing value setup register, which is generated by the supplemental clock timing generation section 60, and the count value match in comparison. In this operation, the flip-flop 35 is reset to zero responding to the reset signal S38 which is generated each time the comparator 64 detects a match, then the value is counted up synchronizing with the reference clock R-CLK. When the counter value matches the setup value of the dividing value setup register 32, the comparator 64 generates the communication clock C-CLK, and when the counter value matches ½ of the setup value, the comparator 65 generates the supplemental clock S-CLK.

Figure 15:
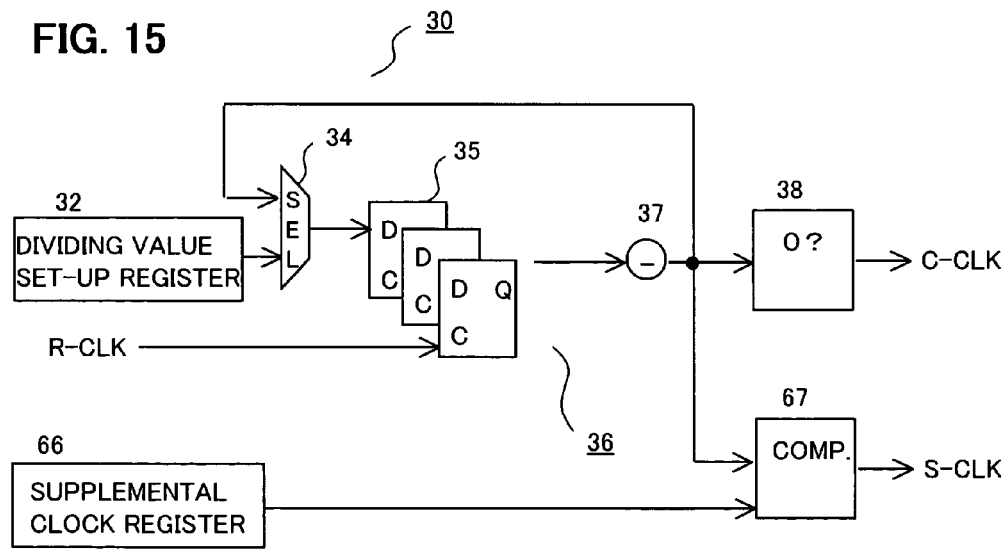
FIG. 15 is a block diagram depicting still another communication clock generation unit according to the present embodiment.

FIG. 15 is a block diagram depicting still another communication clock generation unit according to the present embodiment. In this communication clock generation circuit, the supplemental clock timing generation section 60, which has a function to shift to the right 1 bit as shown in FIG. 11, is not used, but the supplemental clock register 66 is disposed, and the supplemental clock S-CLK is generated by the supplemental clock generation section 67 for comparing that register value and the counter value CNT. The other structures are same as FIG. 11. In this case, the supplemental clock can be set to any timing between the adjacent communication clocks.

The generation timing of the supplemental clock may be alternately changed between the counter value when the dividing value M of the register is shifted to the right 1 bit, and the counter value when +1 is added thereto. By this, in the case of the example in FIG. 13A, the average value of the timing of the supplemental clock S-CLK comes roughly to the center of the communication clock C-CLK, and resistance to noise can be increased.

Figure 16:
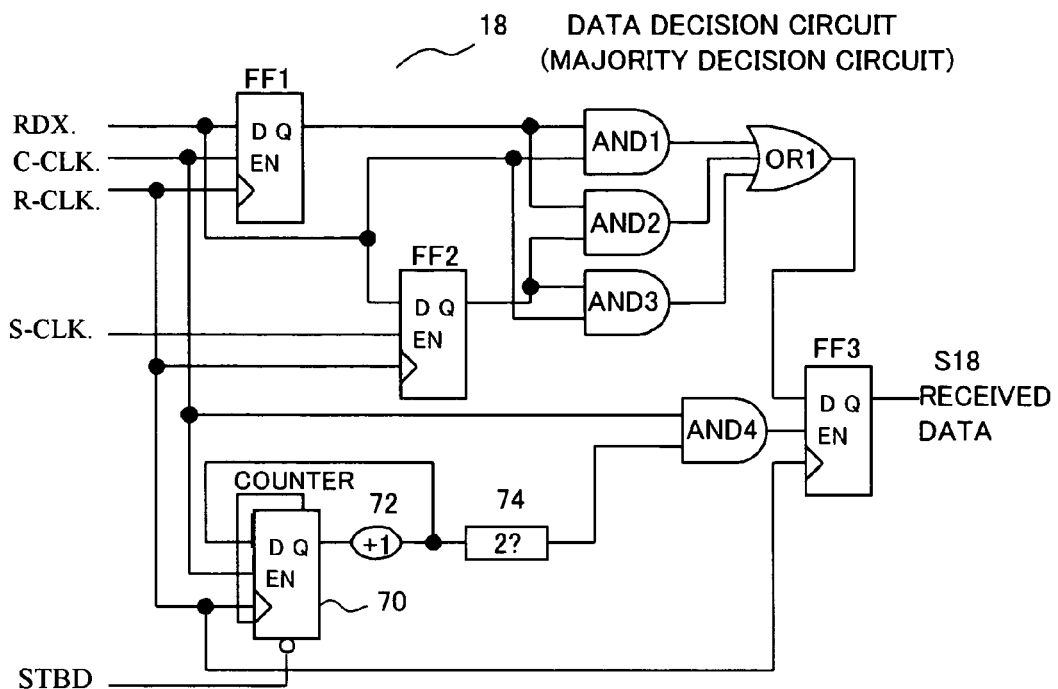
FIG. 16 is a block diagram depicting the data decision circuit according to the present embodiment.

FIG. 16 is a block diagram depicting the data decision circuit according to the present embodiment. The data decision circuit 18 samples the receive data three times by the communication clock C-CLK, which is generated each time the number of dividing values of the reference clocks are generated, and the supplemental clock S-CLK which is generated between the communication clocks, and the receive data is decided from this sampling data by majority. The flip-flop FF1 loads the serial data RDX to be received synchronizing with the reference clock R-CLK when the communication clock C-CLK is at H level, and the flip-flop FF2 loads the serial data RDX to be received synchronizing with the reference clock R-CLK when the supplemental clock S-CLK is at H level. And the three AND gates AND1, AND2 and AND3 and the OR gate OR1 are circuits for deciding majority among the output of the flip-flop FF1, output of the flip-flop FF2 and the data RDX which is received instantaneously, and when at least one of the three pairs of combinations of the three sampled data match, the AND gate corresponding to that input combination outputs the H level.

The flip-flop 70 and the increment circuit 72 constitute the ring counter, which is reset by the start bit detection signal STBD from the start bit detection circuit 16, counted up until the communication clock C-CLK becomes H, and is ring-counted from 0 to 3 at every cycle of the serial data. The comparison circuit 74 outputs H level to the AND gate AND 4 when the count output of the ring counter becomes 2, and enables the flip-flop FF3 when the next communication clock C-CLK becomes H level. The flip-flop FF3 which was enabled loads the output of the OR gate with synchronizing with the reference clock R-CLK, and the receive data S18 is output.

Figure 17:
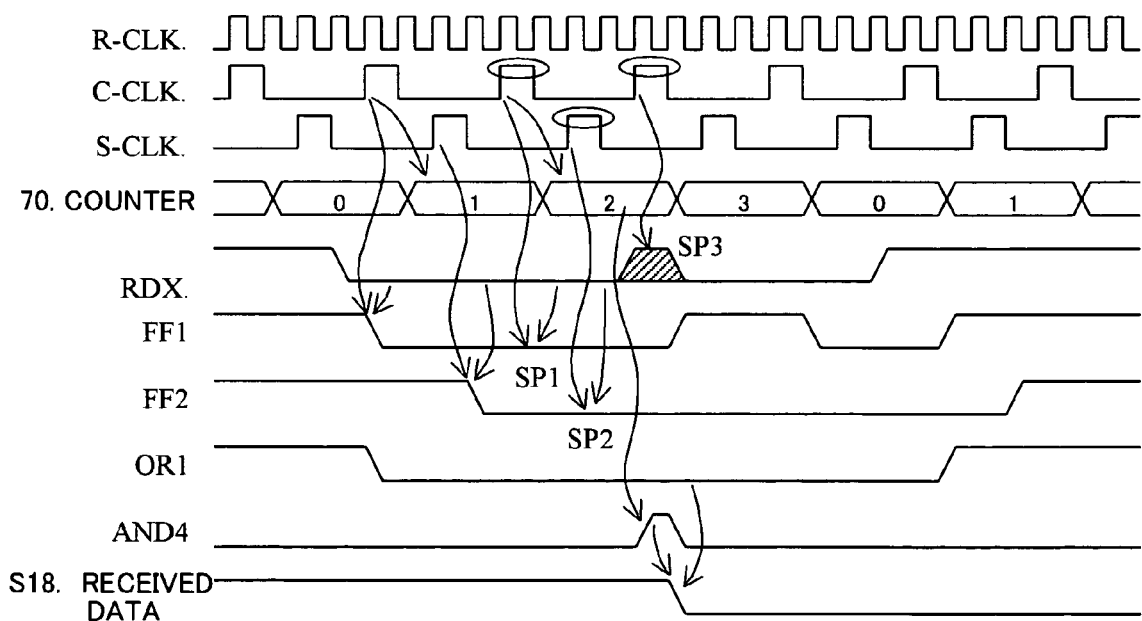
FIG. 17 is a waveform diagram depicting the operation of the data decision circuit.

FIG. 17 is a waveform diagram depicting the operation of the data decision circuit. With reference to this data waveform diagram, the operation of the data decision circuit will be described. When the data cycle of the first bit starts, the flip-flop 70 of the counter is reset responding to the start bit detection signal STBD, which is not illustrated, and the counter value becomes zero. When the subsequent data cycle starts, the 2-bit flip-flop 70 loads the counter value incremented by the increment circuit 72. So each time the communication clock C-CLK becomes H level, the signal of the serial data RDX is loaded to the flip-flop FF1, and each time the supplemental clock S-CLK becomes H level, the signal of the serial data RDX is loaded to the flip-flop FF2. When the communication clock C-CLK becomes H level during the period when the counter value is 2, the result of the decision by majority is loaded to the flip-flop FF3.

Therefore the continuous communication clocks before the counter value becomes 2 and the supplemental clock therebetween become the three sampling timings SP1, SP2 and SP3. In the case of the example in FIG. 15, noise is superimposed on the received serial data RDX at the third sampling timing SP3, but the detection data at the first and second sampling timings SP1 and SP2 are both at L level, so the three inputs are L, L and H, and the output of the AND gates AND1, 2 and 3 are all at L level. As a result, L level is loaded to the flip-flop FF3, and L level is decided as the receive data S18. In this way, the data decision circuit 18 detects the three clock timings to be sampled by the ring counter, and outputs the decision by majority result at this time as the receive data.

According to the above embodiment, one supplemental clock is generated between the adjacent communication clocks, but an odd number of supplemental clocks may be generated. In this case, only the supplemental clocks may be used as the sampling clocks.

In the above embodiment, a supplemental clock is generated between all the adjacent communication clocks, but when four communication clocks are generated in one data cycle, a supplemental clock may be generated only between the second and third communication clocks of the data cycle. Or when 8 communication clocks are generated in one data cycle, a supplemental clock may also be generated between the fourth and fifth communication clocks of the data cycle.

However, in order to adjust the cycle of the communication clocks and the cycle of the data communication to be best by controlling the cycle of the communication clocks at high resolution, it is desirable to minimize the number of communication clocks in one data cycle, and to maximize the cycle of the communication clock. As a consequence, it is preferable that the number of communication clocks in one data cycle is 4. In this case, the second and third communication clocks in one data cycle and the supplemental clock therebetween are used as the sampling clocks, as the above embodiment shows.

What is claimed is:

1. A serial communication device receiving serial data synchronizing with a communication clock, comprising:
a clock generation unit dividing a reference clock according to a predetermined dividing value, generating the communication clock with a timing corresponding to said dividing value of said reference clock, and generating a supplemental clock with an arbitrary timing of said reference clock between adjacent communication clocks; and
a data decision circuit receiving said serial data, sampling 1-bit data at sample timings including at least the adjacent communication clocks and the supplemental clock therebetween, and deciding a value of said 1-bit data according to a majority of said sampled 1-bit data.

2. The serial communication device according to claim 1, wherein when said predetermined dividing value is an odd number, said clock generation unit generates the supplemental clock at a timing of the reference clock which is shifted from a central timing between said adjacent communication clocks.

3. The serial communication device according to claim 1, wherein when said predetermined dividing value is an even number, said clock generation unit generates the supplemental clock at a timing of the reference clock matching with a central timing between said adjacent communication clocks or at a timing of the reference clock which is shifted from said central timing.

4. The serial communication device according to claim 1, wherein said clock generation unit comprises a dividing value register in which a setup value corresponding to said dividing value is set, and a counter for counting down said setup value with synchronizing with said reference clock or counting up to said setup value with synchronizing with said reference clock, and generating a communication clock each timing corresponding to said dividing value of said reference clocks.

5. The serial communication device according to claim 4, wherein said clock generation unit further generates said supplemental clock each time said counter value reaches ½, ½+1 or ½−1 value of said setup value.

6. The serial communication device according to claim 4, wherein said clock generation unit further comprises a supplemental clock register for setting a timing to generate said supplemental clock, and a supplemental clock generation circuit for generating said supplemental clock each time said counter value reaches a setup value of said supplemental clock register.

7. The serial communication device according to claim 1, wherein said data decision circuit comprises a first flip-flop for capturing said serial data with synchronizing with said communication clock, and a second flip-flop for capturing said serial data with synchronizing with said supplemental clock, wherein the majority of said first and second flip-flop data and a serial data at a predetermined timing is decided for 1-bit data, and received data is generated.

8. The serial communication device according to claim 7, wherein said data decision circuit further comprises a communication clock counter for repeatedly counting the number of said communication clocks which are generated during a period of said 1-bit data, wherein said majority is decided each time the counter value of said communication clock counter reaches near ½ of the number of communication clock count corresponding to said 1-bit data period.

9. The serial communication device according to claim 8, wherein the communication clock counter in said data decision circuit starts the count operation in response to a start bit which exists at the beginning of said serial data.

10. The serial communication device according to claim 1, wherein said reference clock is generated at a device which receives said serial data.

11. The serial communication device according to claim 1, wherein said dividing value is set such that the cycle of said communication clock becomes ¼ of the cycle of said serial data.

12. A serial communication device receiving serial data synchronized with a communication clock, comprising:
a clock generation unit that is capable of being set with a dividing value and divides a reference clock according to said set value, generates the communication clock at a timing corresponding to said dividing value of said reference clock, and further generates a supplemental clock between a pair of adjacent communication clocks; and
a data decision circuit receiving said serial data, sampling 1-bit data at sampling timings that include at least said pair of adjacent communication clocks and the supplemental clock therebetween, and deciding said 1-bit data according to a majority of the plurality of said sampled 1-bit data.

13. The serial communication device according to claim 12, wherein the setup value corresponding to the dividing value to be set in said clock generation unit is set so as to match a cycle of said serial data.

14. The serial communication device according to claim 12, wherein said clock generation unit comprises a counter that counts with synchronizing with said reference clock, wherein said communication clock is generated each time the counter value of said counter reaches said dividing value, and said supplemental clock is generated each time said count value reaches near ½ of said dividing value.

* * * * *